(12) United States Patent
Wei

(10) Patent No.: US 7,153,074 B2
(45) Date of Patent: Dec. 26, 2006

(54) RETRACTABLE FASTENER DEVICE AND METHOD FOR FACILITATING THE FASTENING OF MULTIPLE OBJECTS

(75) Inventor: Chih-Shing Wei, Lattingtown, NY (US)

(73) Assignee: Grace-Comp Systems, Ltd., Lattingtown, NY (US)

( * ) Notice: Subject to any disclaimer, the term of this patent is extended or adjusted under 35 U.S.C. 154(b) by 32 days.

(21) Appl. No.: 10/903,776

(22) Filed: Jul. 30, 2004

(65) Prior Publication Data

US 2006/0024143 A1 Feb. 2, 2006

(51) Int. Cl.
*F16B 13/04* (2006.01)

(52) U.S. Cl. .......................... 411/21; 411/347; 411/348

(58) Field of Classification Search .................. 411/21, 411/344, 347, 348, 349, 551; 403/408.1, 403/353; 16/2.1
See application file for complete search history.

(56) References Cited

U.S. PATENT DOCUMENTS

| | | | |
|---|---|---|---|
| 1,854,737 A | 4/1932 | Haug | |
| 2,597,857 A * | 5/1952 | Francis | 411/344 |
| 2,857,950 A | 10/1958 | Tingley | |
| 3,046,827 A * | 7/1962 | Myers | 411/348 |
| 3,145,441 A * | 8/1964 | Strandrud | 411/347 |
| 3,202,038 A | 8/1965 | Bass | |
| 3,535,750 A * | 10/1970 | Metz | 411/555 |
| 3,669,481 A * | 6/1972 | Bergmann | 292/49 |
| 4,722,649 A | 2/1988 | Ferguson | |
| 5,189,779 A * | 3/1993 | Fishel et al. | 29/453 |
| 5,346,349 A * | 9/1994 | Giovannetti | 411/549 |
| 5,429,464 A | 7/1995 | Eshraghi | |
| 6,224,309 B1 | 5/2001 | Yamamoto | |

FOREIGN PATENT DOCUMENTS

| | | |
|---|---|---|
| DE | 36 26 052 A1 | 2/1987 |
| GB | 2297595 A | 8/1996 |

* cited by examiner

*Primary Examiner*—Flemming Saether
(74) *Attorney, Agent, or Firm*—Alston & Bird LLP

(57) ABSTRACT

A retractable fastener device and method for facilitating the fastening of multiple objects are provided. The retractable fastener may extend through an aperture defined in at least one component having a first side and a second side and further includes a tab device that may be extended and/or retracted so as to selectively prevent the retractable fastener device from being removed from the aperture through the first side.

14 Claims, 9 Drawing Sheets

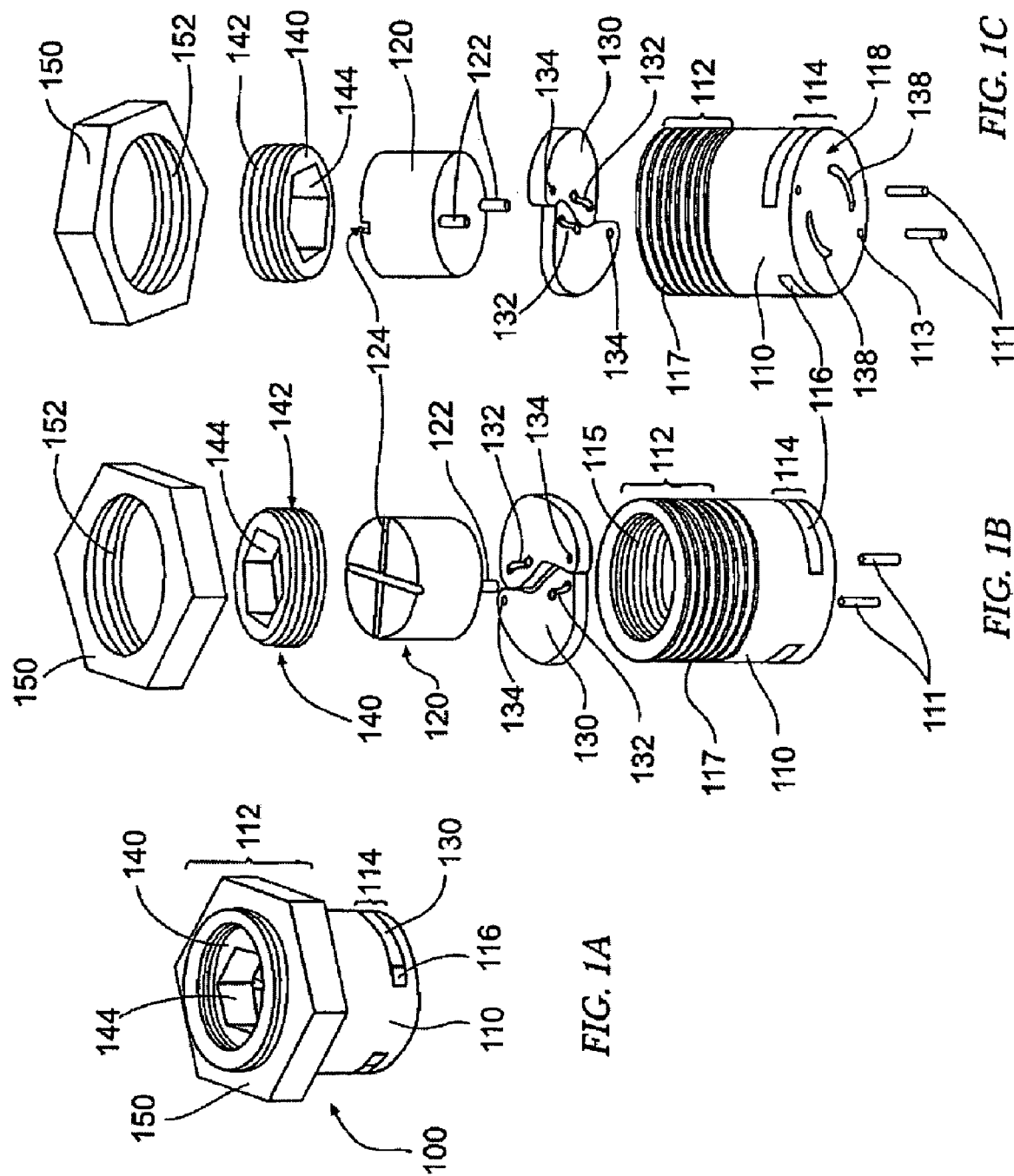

RETRACTABLE FASTENER DEVICE AND METHOD FOR FACILITATING THE FASTENING OF MULTIPLE OBJECTS

FIELD OF THE INVENTION

The present invention relates generally to fastener devices adapted to extend through an aperture defined in at least one component, and specifically, providing a retractable fastener that may extend through an aperture defined in an least one component from a first side to a second side and then be selectively retained therein via the actuation of a tab device extending substantially laterally outward from the retractable fastener on the second side. More particularly the retractable fastener device and method of the present invention may allow the retractable fastener to be selectively withdrawn from the aperture by retracting the tab device and removing the retractable fastener from at least the second side.

BACKGROUND OF THE INVENTION

Specialty fasteners such as blind fasteners are sometimes used to extend through an aperture defined in a sheet material that has a first side and a second side. Such fasteners typically extend through the aperture and are then actuated from the first side so as to expand and engage the second side of the sheet material such that the blind fastener may be secured within the aperture. These fasteners are also often used to affix two or more workpieces together wherein one side of the workpiece is not readily accessible.

Some types of removable blind fasteners are also known for affixing two metal layers having a first side and a second side wherein the fastener may be inserted through an aperture so as to affix the two metal layers. For example, U.S. Pat. No. 2,857,950 to Tingley (the '950 patent) discloses a removable blind fastener with pivoted securing legs wherein the legs may be pivoted with respect to a body of the blind fastener so as to engage a second side of two layers of sheet metal. However, the '950 patent requires that the pivoted securing legs be secured to the second side by the use of additional bolts that must be inserted through the sheet metal layers to engage the pivoted securing legs with the second side. In addition, the '950 patent requires that the legs be pivoted into contact with the second side via wires having crimped ends to engage the pivoted leg through which it passes. Thus, the retractable blind fastener requires the actuation of the wires to engage the pivoted legs with the second side as well as the installation of at least two separate bolts to secure the pivoted legs to the second side.

Another type of blind fastener includes a "push-type" fastener that also may be removable and reusable. Such push-type fasteners may include a sleeve into which is slid a push bolt such that the blind fastener may be installed and removed by hand, without the use of any tools. For instance, U.S. Pat. No. 3,202,038 to Bass (the '038 patent) discloses a push-type blind fastener including a sleeve into which is slidably engaged a push bolt having a single annular locking and releasing groove defined therein. The push bolt may be pushed to a first position so as to engage a resilient locking and securing tab that are attached to the sleeve and resiliently biased inwardly with respect to the sleeve. In the first position, the push bolt may be positioned so as to urge the resilient locking and securing tabs laterally outward so as to engage an unaccessible surface of a workpiece so as to secure the sleeve with respect to an aperture defined in the workpiece. Further, the blind fastener of the '038 patent also provides that the push bolt may be pushed to a second position such that the annular locking and securing groove becomes aligned with the resilient locking and securing tabs so that they may return to their inwardly biased position with respect to the sleeve, thereby releasing their engagement with the inaccessible surface of the workpiece and allowing the sleeve (and blind fastener) to be removed completely from the aperture. While the blind fastener of the '038 patent is easily actuated without the use of tools, it also allows the blind fastener to be easily removed by the movement of the push bolt to the second position, and thus the blind fastener may be inadvertently removed when its removal is not desired. In addition, the resilient locking and securing tabs of the blind fastener of the '038 patent may experience fatigue such that the securing tabs may eventually lose their resilient inward bias such that the blind fastener may be rendered non-removable after repeated use. Also, the blind fastener of the '038 patent does not allow for adjustment of the distance between the resilient locking and securing tabs and a head of the blind fastener, and as such, the blind fastener may only securely and properly engage a workpiece having a single fixed thickness that is equivalent to the distance between the resilient locking and securing tabs and a head of the blind fastener.

Other types of blind fasteners may provide spring mechanisms for engaging the inaccessible side of one or more workpieces through an aperture. While such spring mechanisms may provide a quick engagement with the inaccessible side, they also lack a mechanism for recoiling the spring mechanism. Thus, such spring mechanism blind fasteners may not be removable via the aperture once they are engaged with the inaccessible side. For instance, U.S. Pat. No. 4,722,649 (the '649 patent) to Ferguson describes a releasable fastening device for securing workpieces together, and includes an expandable device in the form of a stiff spring located within an annular recess in a shank of the fastening device. Furthermore, the '649 patent discloses a mechanism which releasably engages the spring and is capable of limiting the spring's extension to within the annular recess until such time as the fastener is inserted into an aperture defined in one or more workpieces. Once inserted, the mechanism may release the spring so that it may engage a bottom surface of a lower workpiece so as to secure the fastener within the aperture. The '649 patent's release mechanism, however, provides no mechanism for recoiling the spring, such that once the blind fastener is engaged with the bottom surface of the lower workpiece it may not be easily removed without damaging either the fastener or the workpiece. The releasable fastening device of the '649 patent also does not provide for the adjustment of the distance between the spring and a head of the fastening device such that the blind fastener may only securely engage sheet materials having a fixed thickness.

Other types of blind fasteners have been disclosed which may extend through an aperture defined in a material and be capable of engaging an inaccessible side of the material by actuating a mechanism on the accessible side of the blind fastener that acts to deform a portion of the blind fastener extending through the aperture to the inaccessible side of the material. For instance, U.S. Pat. No. 5,429,464 to Eshraghi (the '464 patent) discloses a blind fastener having a fastener body extending through an aperture defined by one or more workpieces. The body has a stem passing therethrough such that the stem may be pulled away from the workpieces from the first side in order to pull an anvil washer and an expander collar into the body so as to laterally expand and bulb the fastener body on the second side of the workpieces. Similarly, U.S. Pat. No. 6,224,309 to Yamamoto (the '309 patent) discloses a blind fastener having a hollow bolt for extending through an aperture defined by a workpiece. The blind fastener of the '309 patent also includes a threaded core bolt and a "pull up nut" engaged with the core bolt such that as the core bolt is turned within the hollow bolt, the pull up nut is "pulled up" into contact with the body portion of the hollow bolt so as to deform the body portion such that the deformed body portion engages the inaccessible side of the workpiece. In both the '464 and '309 patents, the blind fasteners may be actuated from the accessible first side of a workpiece so as to deform an inaccessible portion of the blind fastener. Both of these fasteners, however, require the deformation of a sleeve or body portion in order to engage an inaccessible side of the workpiece. Once deformed, however, these blind fasteners may not be easily removable without damaging one or more of the workpieces. In addition, once deformed, these blind fasteners may not be reusable.

Therefore, there exists a need for a retractable fastener device that is capable of extending through an aperture defined in at least one component having a first side and a second side and selectively and retractably engaging the second side so as to selectively prevent the fastener device from being removed from the aperture from the first side. In addition, there further exists a need for a retractable fastener device that is relatively simple to install, able to firmly engage a first side and a second side of at least one component, robust, and reusable. There also exists a need for a retractable fastener device that may be easily adjusted to be secured within an aperture defined in at least one component wherein the at least one component may have a varied thickness. There further exists a need for a retractable fastener device having a conduit configured to allow for communication between the first side and the second side of the at least one component when the retractable fastener device is selectively engaged with the second side of the at least one component.

SUMMARY OF THE INVENTION

The embodiments of the present invention satisfy the needs listed above and provide other advantages as described below. The fastener device of the present invention provides a sleeve adapted to extend through an aperture defined by at least one component having a first side and a second side. Further, a first portion of the sleeve is configured to extend from the aperture on the first side, while a second portion of the sleeve is configured to extend from the aperture on the second side. The fastener device also comprises an actuator device operably engaged with the first portion of the sleeve and configured to be actuated from the first side and a tab device operably engaged with the second portion of the sleeve and capable of operably engaging the actuator device. Thus, the tab device may be responsive to the actuator device as the actuator device is actuated so as to extend the tab device substantially laterally outward from the second portion of the sleeve such that the tab device thereby cooperates with the actuator device so as to become selectively engaged with the second side of the at least one component.

According to some embodiments, the actuator device further comprises a slug disposed at least partially within the sleeve such that the slug is configured to be capable of rotating with respect to an inner surface of the sleeve, and wherein the slug has at least one pin extending therefrom toward the second portion of the sleeve defining a slit. Thus, the tab device may be disposed within the sleeve and may be capable of operably engaging the at least one pin. The tab device may be responsive to the at least one pin as the slug is rotated such that the tab device may extend laterally outward through the slit to an extended position as the slug is rotated in a first direction, and such that the tab device may retract laterally inward through the slit to a retracted position as the slug is rotated in a second direction. Thus, the tab device may cooperate with the slug so as to selectively prevent the sleeve from being removed from the aperture through the first side. Therefore, the slug may be used to selectively actuate the tab device to selectively engage the second side of the at least one component. According to some embodiments, the slug may be configured to be capable of rotating less than about one half turn with respect to the inner surface of the sleeve in order to extend the tab device from the retracted position to the extended position. The slug may be further configured to be capable of rotating about one quarter turn with respect to the inner surface of the sleeve in order to extend the tab device from the retracted position to the extended position.

According to other embodiments, fastener device of the present invention may further comprise a plug device disposed at least partially adjacent to the sleeve, the first side, and the slug. The plug device may be configured to be capable of being tightened with respect to the slug so as to selectively prevent the slug from being removed from the sleeve through the first side. The fastener device may also further comprise a nut disposed at least partially around an outer surface of the first portion of the sleeve. Further, the nut may be configured to be capable of being tightened with respect to the first side so as to selectively prevent the sleeve from being removed from the aperture through the second side. In some embodiments, the slug of the fastener device of the present invention may further define a conduit extending through the slug so as to allow communication through the sleeve between the first side and the second side when the tab device is extended laterally outward through the slit.

The embodiments of the present invention also provide a method for facilitating the attachment of a fastener device comprising a sleeve to at least one component having a first side and a second side. The method may comprise the steps of: inserting the fastener device through an aperture defined by the at least one component such that an first portion of the sleeve extends from the aperture on the first side, and such that an second portion of the sleeve extends from the aperture on the second side; and expanding a tab device from a slit defined by the second portion of the sleeve so as to selectively prevent the sleeve from being removed from the aperture through the first side. According to other embodiments, the method may further comprise the step of tightening a nut disposed at least partially around an outer surface of the first portion of the sleeve such that the nut is secured with respect to the first side so as to selectively prevent the sleeve from being removed from the aperture through the second side. In some method embodiments, the expanding step may further comprise the step of rotating a slug disposed at least partially within the sleeve. The slug may further be operably engaged with the tab device so as to be further configured to be capable of expanding the tab device from the slit so as to selectively prevent the sleeve from being removed from the aperture through the first side.

Thus the various embodiments of the fastener device and method of the present invention provide many advantages that may include, but are not limited to: providing a retractable and selectively removable fastener that is easily installed and removed from an aperture defined in an least one component, providing a fastener device that may be securely installed in an aperture defined in at least one component having a variable thickness, and allowing the fastener device to fully engage a second side of the at least one component by actuating a tab device to engage the second side. Some embodiments of the fastener device and method of the present invention provide the added advantage of forming a conduit through the fastener device between a first side and a second side of the at least one component.

These advantages, and others that will be evident to those skilled in the art, are provided in the fastener device and method of the present invention.

BRIEF DESCRIPTION OF THE DRAWINGS

Figure 2A:
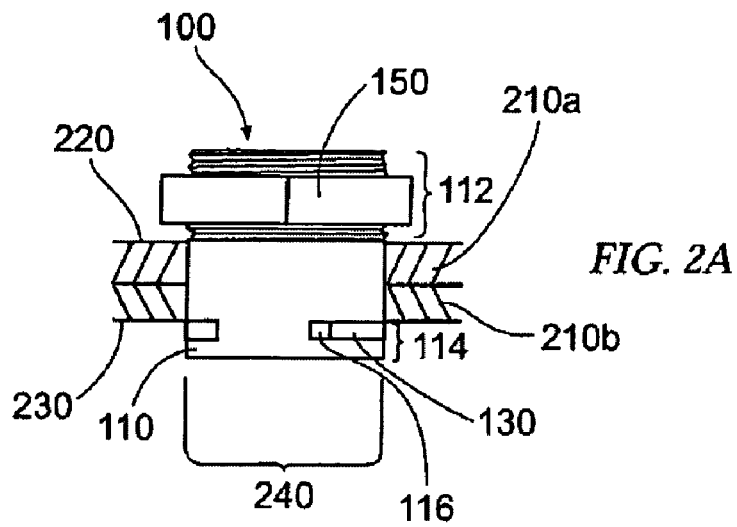
Figure 2B:
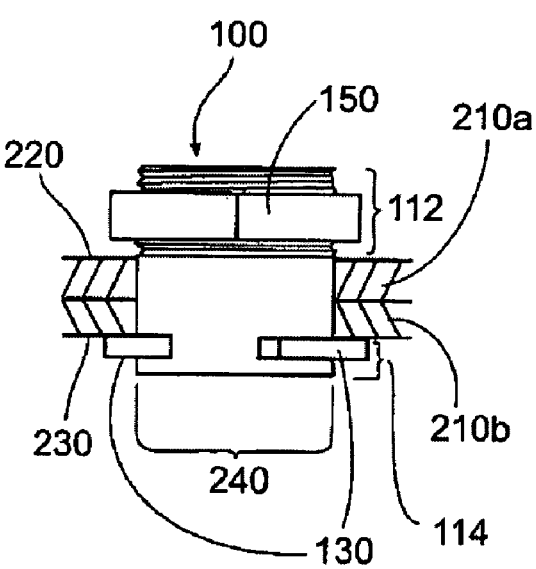
Figure 2C:
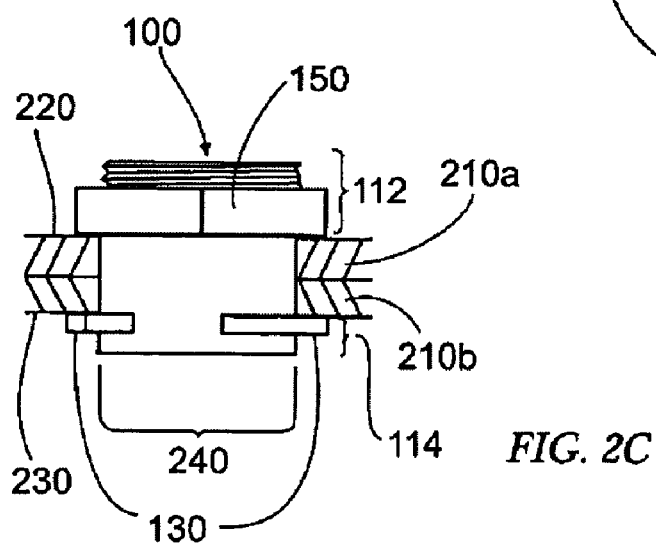
Figure 3B:
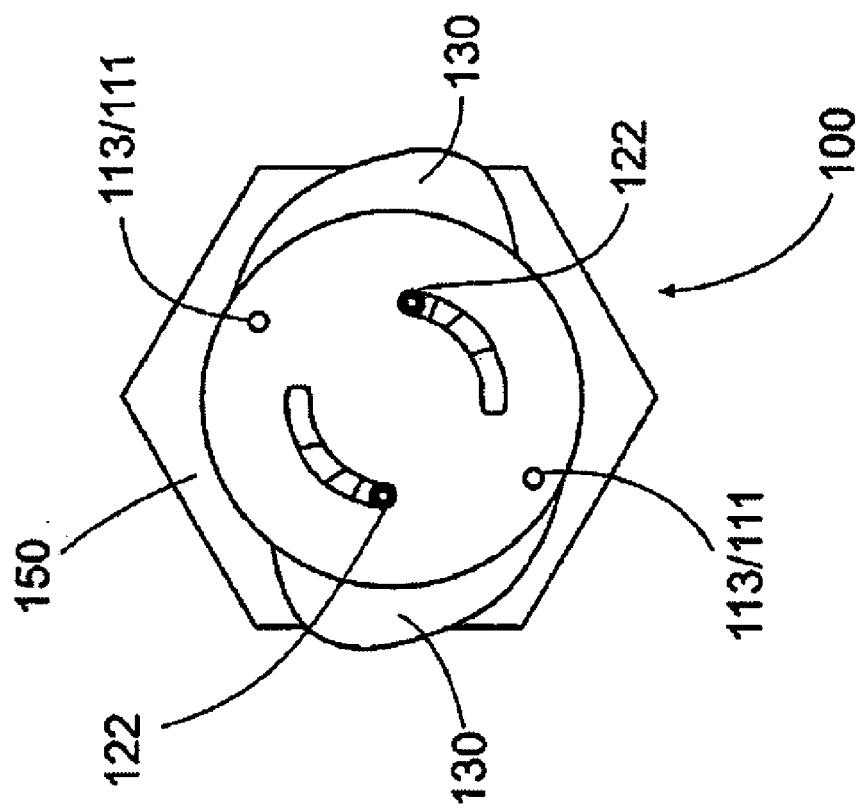
Figure 3A:
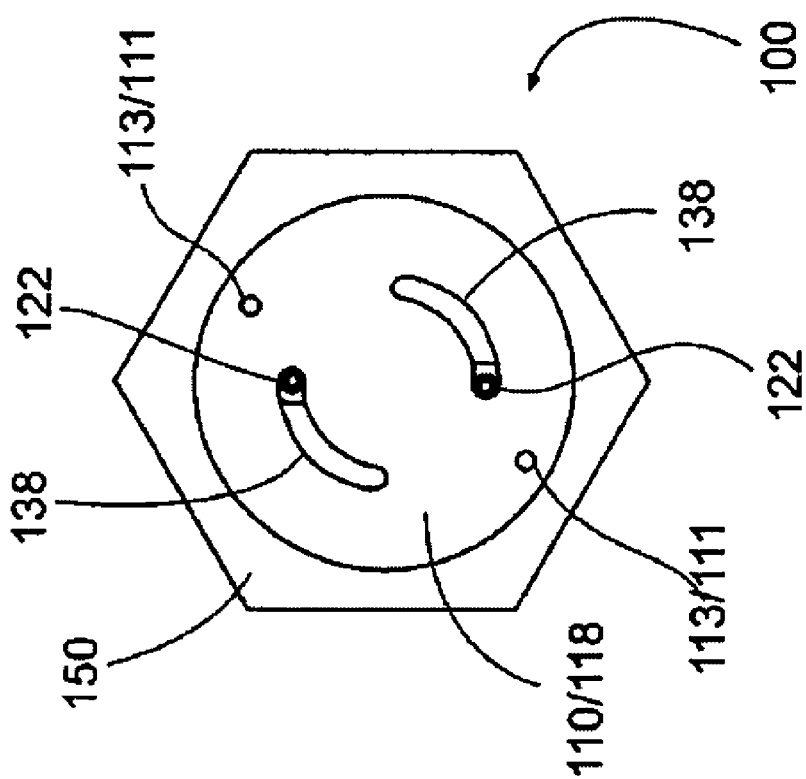
Figures 4A, 4B:
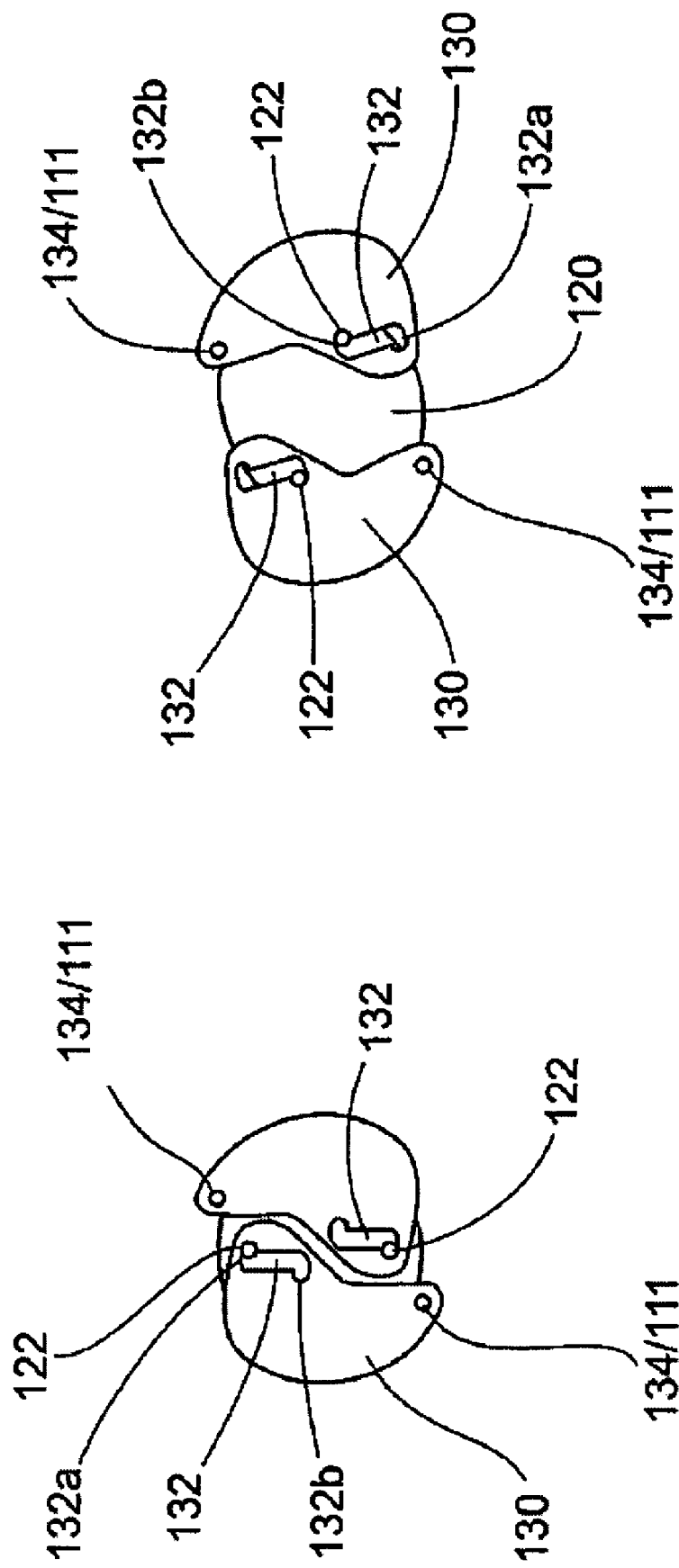
Figure 5:
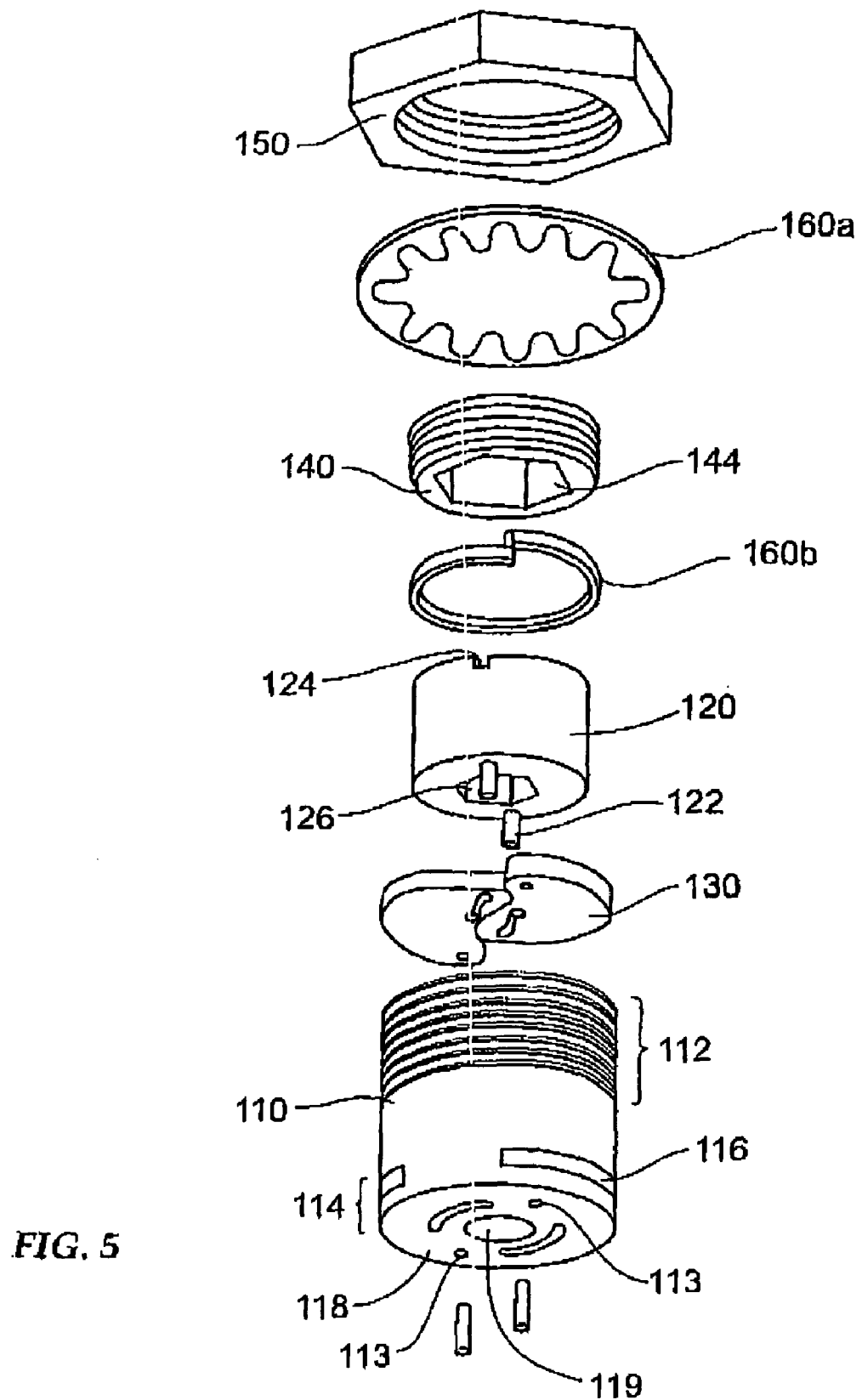
Figure 6:
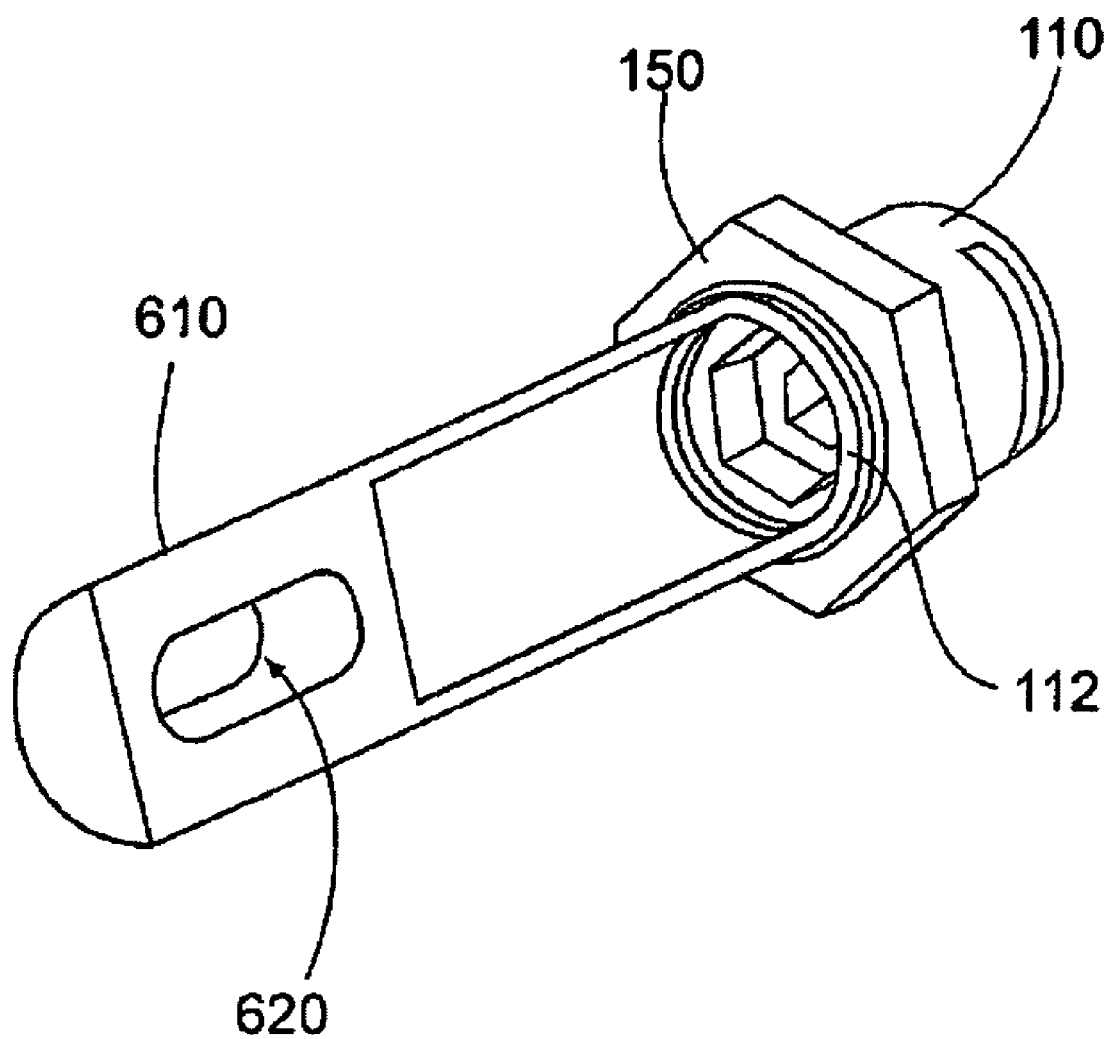
Figure 7:
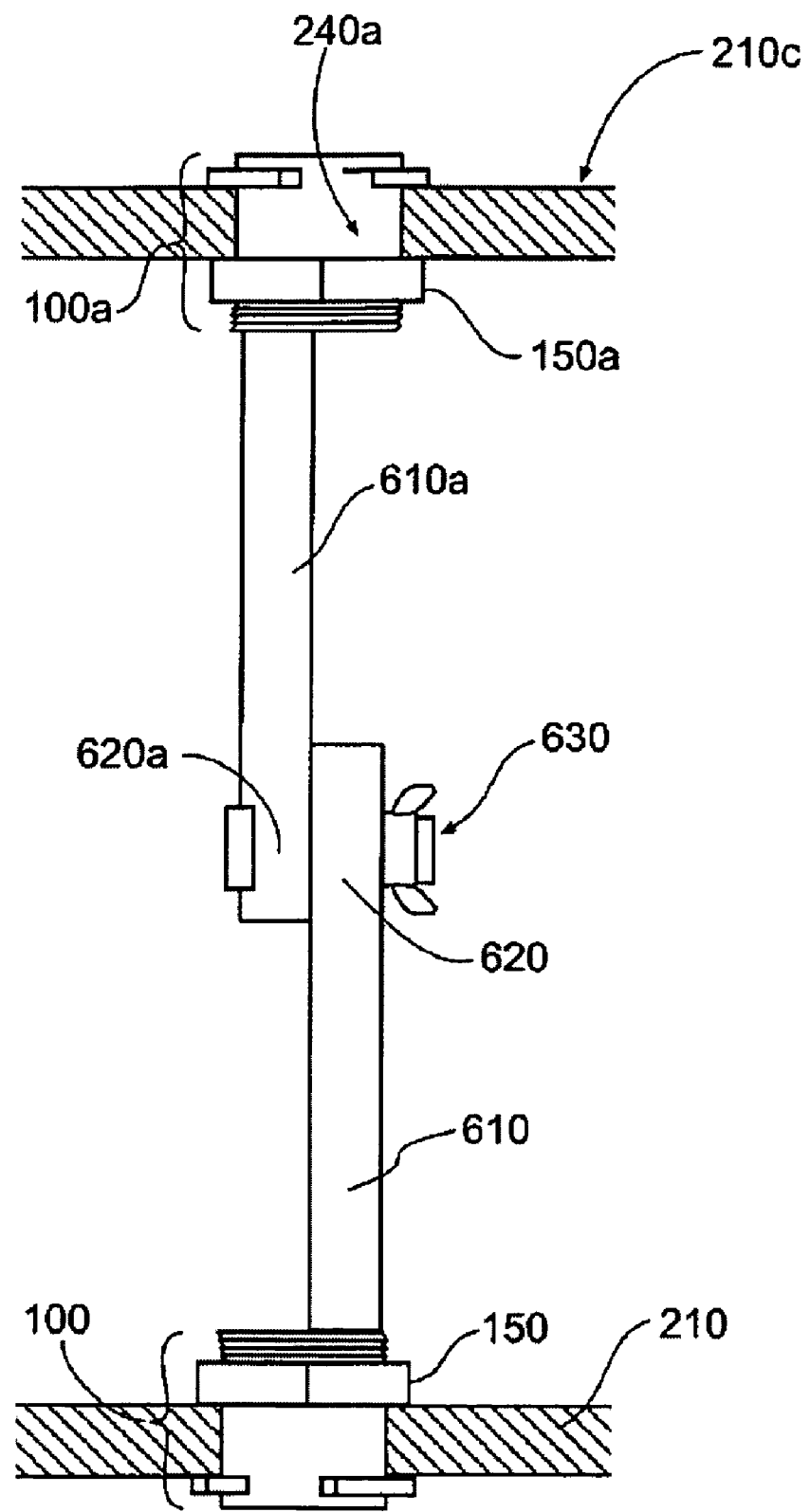
Figure 8:
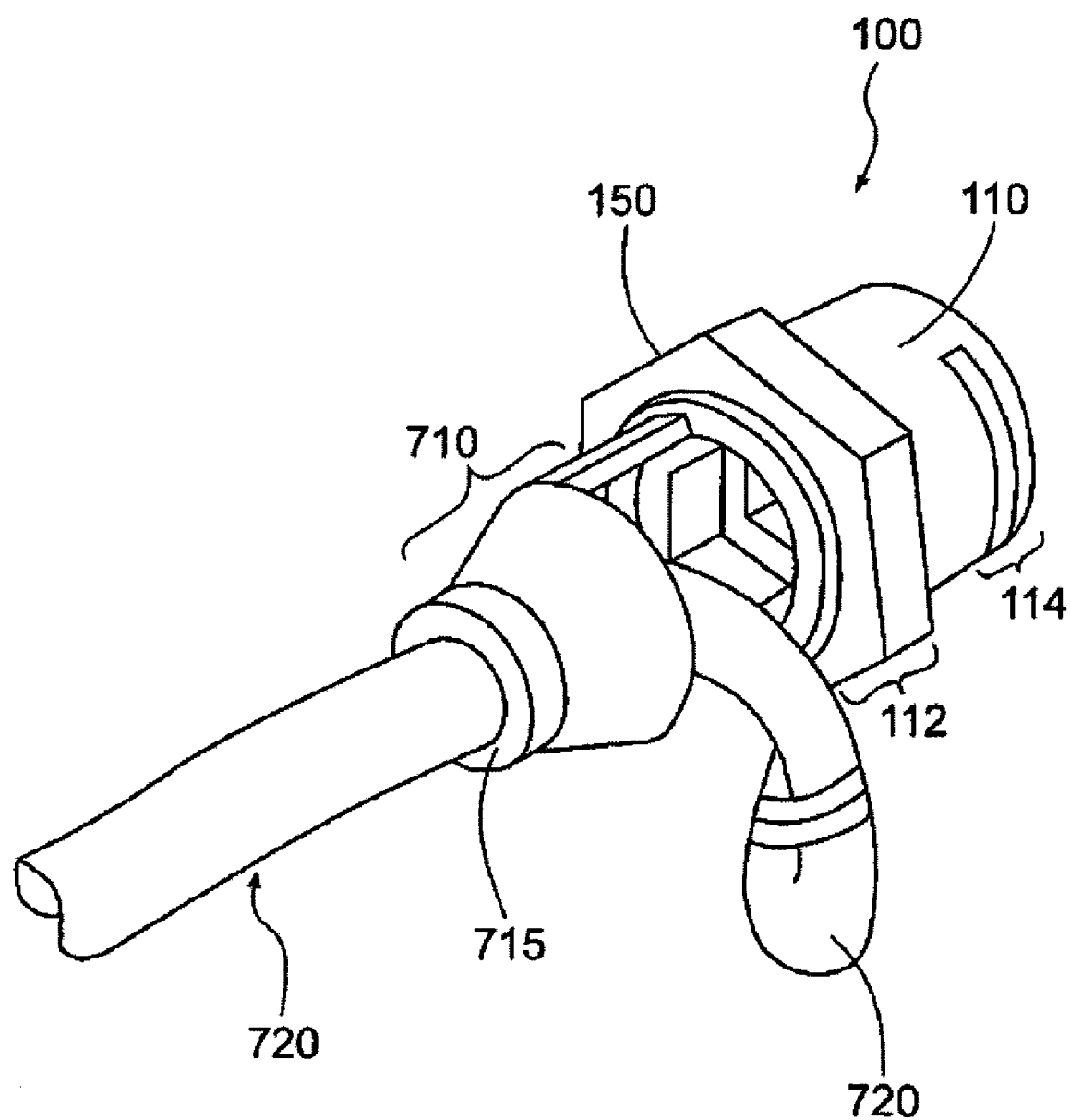

Having thus described the invention in general terms, reference will now be made to the accompanying drawings, which are not necessarily drawn to scale, and wherein:

FIG. 1A shows a perspective view of a fastener device according to one embodiment of the present invention;

FIG. 1B shows an exploded perspective view of a fastener device according to one embodiment of the present invention;

FIG. 1C shows an alternate exploded perspective view of a fastener device according to one embodiment of the present invention;

FIG. 2A shows a side cross-sectional view of a fastener device according to one embodiment of the present invention placed in an aperture defined in two stacked components wherein the tab device is not engaged with the second side of the stacked components;

FIG. 2B shows a side cross-sectional view of a fastener device according to one embodiment of the present invention placed in an aperture defined in two stacked components wherein the tab device is engaged with the second side of the stacked components;

FIG. 2C shows a side cross-sectional view of a fastener device according to one embodiment of the present invention placed in an aperture defined in two stacked components wherein the tab device is engaged with the second side of the stacked components and a nut is engaged with the first side of the stacked components;

FIG. 3A shows a bottom view of the fastener device according to one embodiment of the present invention wherein the tab device is in the retracted position with respect to the sleeve;

FIG. 3B shows a bottom view of the fastener device according to one embodiment of the present invention wherein the tab device is in the extended position with respect to the sleeve;

FIG. 4A shows a bottom view of the fastener device according to one embodiment of the present invention wherein the tab device is in the retracted position with respect to the sleeve—the nut and sleeve are omitted from this view;

FIG. 4B shows a bottom view of the fastener device according to one embodiment of the present invention wherein the tab device is in the extended position with respect to the sleeve—the nut and sleeve are omitted from this view;

FIG. 5 shows an exploded perspective view of a fastener device according to one embodiment of the present invention wherein a conduit is defined in the slug and the sleeve;

FIG. 6 shows a perspective view of a fastener device according to one embodiment of the present invention further comprising an extension device;

FIG. 7 shows a front view of two fastener devices, both having respective extension devices configured to connect two adjacent workpieces defining apertures having the fastener devices extending therethrough; and FIG. 8 shows a perspective view of a fastener device further comprising a cord receiver device.

Figure 9:
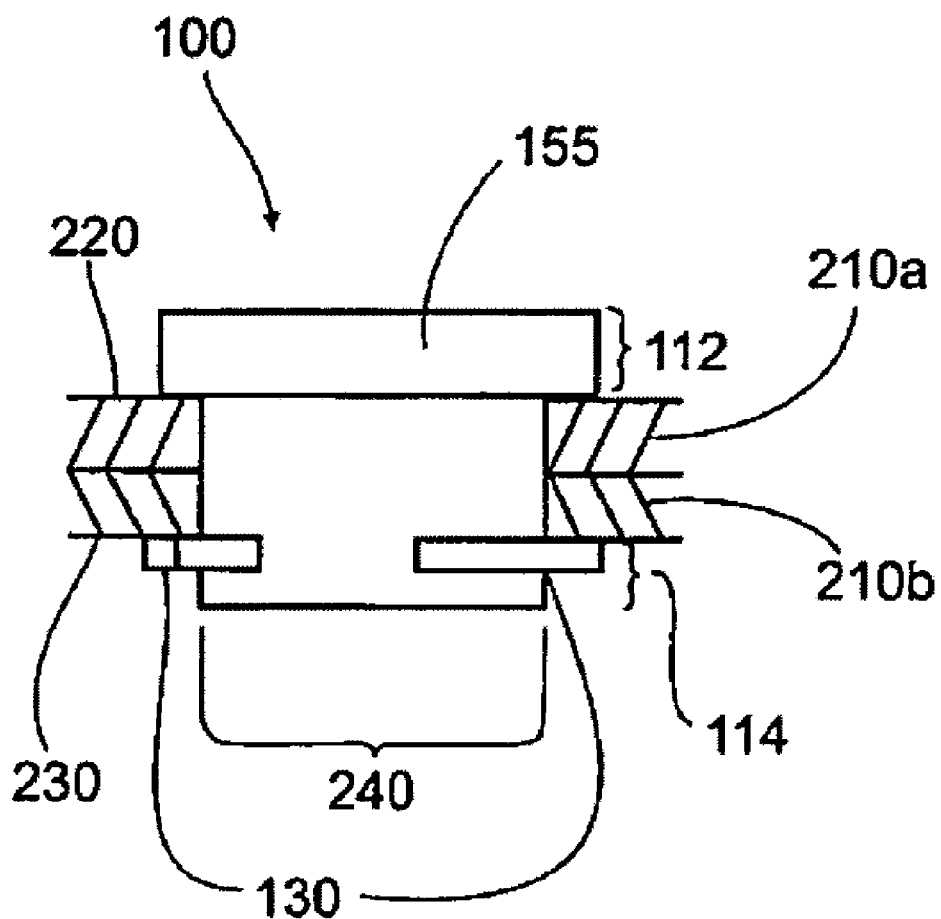

FIG. 9 shows a cross-sectional view of a fastener device according to one embodiment of the present invention.

DETAILED DESCRIPTION OF THE INVENTION

The present invention now will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A shows a perspective view of a fastener device 100 according to one embodiment of the present invention. In some embodiments, the fastener device 100 may comprise a sleeve 110 adapted to extend through an aperture 240 defined by at least one component 210a, 210b having a first side 220 and a second side 230 (see FIG. 2C, showing fastener device 100 installed in an aperture 240). The sleeve 110 of the fastener device 100 may further comprise a first portion 112 being configured to extend from the aperture 240 on the first side 220, and a second portion 114 configured to extend from the aperture 240 on the second side 230. Furthermore according to some embodiments, the second portion 114 of the sleeve 110 may define an aperture 116 and slot 138.

According to some embodiments, the fastener device 100 may further comprise an actuator device, such as, for example a slug 120 (as described more fully below) operably engaged with the first portion 112 of the sleeve 110 and configured to be actuated from the first side (by for instance a tool device, or in some instances, by hand). Furthermore, the fastener device 100 may also comprise a tab device 130 operably engaged with the second portion of the sleeve (and, in some embodiments connected therewith as described more fully below) and capable of operably engaging the actuator device (such as, for instance, the slug 120). The tab device 130 may be responsive to the actuator device as the actuator device is actuated so as to extend substantially laterally outward from the second portion 114 of the sleeve 110. Thus, the tab device 130 may cooperate with the actuator device such as a rotatable slug 120 (see below) so as to become selectively engaged with the second side 230 of the at least one component 210a, 210b.

Thus, according to some embodiments, the fastener device 100 may be suitable for extending through an aperture 240 defined by at least one component 210a, 210b having a first side 220 and a second side 230 (see FIG. 2C), wherein the second side 230 of the at least one component 210a, 210b may not be easily accessible. More particularly, the fastener device 100 according to the various embodiments of the present invention, may be actuated from the first side 220 so as to become selectively engaged with the second side 230 of the at least one component 210a, 210b. For example, the fastener device 100 may be extended through and secured within an aperture defined in installed drywall, within apertures defined in fuselage panels installed on aircraft, in apertures defined in biological materials such as bone or cartilage, or in apertures defined in various other materials wherein the fastener device 100 must be secured in the aperture without accessing an inaccessible or "blind" side of the material.

As shown in the exploded view of the fastener device 100 in FIG. 1B, the actuator device may comprise a slug 120 which may be disposed at least partially within the sleeve 110 and configured to be capable of rotating with respect to an inner surface of the sleeve 110. The slug 120 may have at least one pin 122 extending therefrom toward the second portion 114 of the sleeve 110 defining aperture 116 and slot 138. The fastener device 100 further comprises a tab device 130 disposed at least partially within the sleeve 110. The tab device 130 is further capable of operably engaging the at least one pin 122. Thus, the tab device 130 is responsive to the at least one pin 122 as the slug 120 is rotated so as to extend laterally outward through aperture 116 to an extended position (see FIG. 2C) as the slug 120 is rotated in a first direction, and to retract laterally inward through aperture 116 to a retracted position (see FIG. 2A) as the slug 120 is rotated in a second direction. The tab device 130 may thereby cooperate with the slug 120 so as to selectively prevent the sleeve 110 from being removed from the aperture 240 through the first side 220 (as shown generally in FIG. 2B).

As shown in FIG. 1B, the slug 120 may further comprise a first tool interface 124 configured to be capable of being engaged by and selectively rotated by, a tool, such as, for instance a Philips head screwdriver. In other embodiments, the first tool interface 124 may be configured to be capable of being engaged by and selectively rotated by: flat head screwdrivers, hex head screwdrivers, "star" cross section screwdrivers, and/or other tools suitable for selectively rotating the slug 120 (and the at least one pin 122 extending therefrom) with respect to the tab device 130 so that as the slug 120 is rotated in a first direction, the tab device 130 may be extended substantially laterally outward through aperture 116 to an extended position, and so that as the slug 120 is rotated in a second direction, the tab device 130 may be retracted laterally inward through the aperture 116 to a retracted position. In other embodiments, the slug 120 (or other actuator device—such as, for instance, a knob) may be selectively rotated by hand so as to extend the tab device 130 substantially laterally outward through aperture 116 to an extended position.

As shown generally in FIGS. 4A–4B, the tab device 130 may further comprise a guide slot 132 configured to be capable of receiving the at least one pin 122. The guide slot 132 may further have a first catch stop 132a configured to retain the tab device 130 in the retracted position (see FIG. 4A), and a second catch stop 132b configured to retain the tab device 130 in the extended position (see FIG. 4B). In addition, as shown generally in FIG. 1C, the second portion 114 of the sleeve 110 may further comprise a floor 118 and at least one spring pin 111 extending from the floor 118 toward the first portion 112 of the sleeve 110. Further, the at least one spring pin 111 may be operably engaged with the tab device 130 so that the tab device 130 may rotate about the at least one spring pin 111 so as to extend laterally outward through aperture 116 to an extended position (see FIGS. 3B and 4B) as the slug 120 is rotated in a first direction, and to retract laterally inward through aperture 116 to a retracted position (see FIGS. 3A and 4A) as the slug 120 is rotated in a second direction. According to some embodiments, the second direction may be defined as being opposite the first direction, as shown generally in FIGS. 4A–4B. The at least one spring pin 111 may be inserted through a floor aperture 113 defined in the floor 118 of the sleeve 110 as shown in FIG. 1C, however, in other embodiments, the at least one spring pin 111 may be integrated with the floor 118 of the sleeve 110 as, for instance, a single piece.

As shown in detail in FIGS. 4A–4B, the tab device 130 may define a tab aperture 134 through which the at least one spring pin 111 may extend so as to operably engage the tab device 130. Thus, the tab device 130 may rotate about the at least one spring pin 111 so as to move from a retracted position relative to the sleeve 110 (see FIG. 4A) to an extended position relative to the sleeve (see FIG. 4B). One skilled in the art will appreciate that the tab device may also be integrated and/or molded as part of the sleeve 110 and still be capable of rotating in a manner similar to that shown in FIGS. 4A–4B. As described above with respect to FIGS. 1B–1C, the tab device 130 is operably engaged with at least one pin 122 extending from the slug 120. As shown in FIGS. 4A–4B, as the slug 120 is rotated with respect to the sleeve 110, the at least one pin 122 may actuate the guide slot 132 defined in the tab device 130. Thus, as the slug 120 is rotated, the at least one pin 122 may be actuated with respect to the guide slot as the tab device 130 rotates with respect to the at least one spring pin 111. Thus, the at least one pin 122 may be moved from a first catch stop 132a to a second catch stop 132b as the tab device is extended from the retracted position (see FIG. 4A) to the extended position (see FIG. 4B). The catch stops 132a, 132b may act to temporarily restrain the slug 120 (and the at least one pin 122 extending therefrom) from rotating with respect to the sleeve 110 such that the tab device 130 may be at least partially restrained in either the retracted position (see FIG. 4A) or the extended position (see FIG. 4B) with respect to the sleeve 110.

Furthermore, as shown generally in FIGS. 4A–4B, the guide slot 132 defined in the tab device 130 may also define a range of rotation for the tab device (and the slug 120 and the at least one pin 122 operably engaged therewith) such that the slug 120 need only be rotated through a partial turn (by for instance a tool engaged with the first tool interface 124) in order to extend and/or retract the tab device 130 from the retracted and/or extended position (see FIGS. 3A–3B and 4A–4B) relative to the sleeve 110. A bottom view (as seen from the second side 230 of the fastener device 100) of the fastener device 100 is shown in FIGS. 3A–3B, depicting the range of rotation for the at least one pin 122 relative to the floor 118 of the sleeve 110. The floor 118 defines a slot 138 to receive at least one pin 122. For instance, as shown in FIG. 3A the tab device 130 is in the retracted position (and is not visible) relative to the sleeve 110. In contrast, FIG. 3B shows the tab device 130 in the extended position relative to the sleeve 110 as a result of the at least one pin 122 being rotated with respect to the sleeve 110 through about a one-quarter turn. One skilled in the art will appreciate that the tab device 130 and the guide slot 132 defined therein may be modified so as to engage the at least one pin 122 extending from the slug 120 such that the range of rotation of the slug 120 (and the at least one pin 122 extending therefrom) required to fully extend and/or retract the tab device 130 relative to the sleeve 110 may be increased and/or decreased.

According to some embodiments, such as those shown in FIGS. 1B–1C, the fastener device 100 of the present invention may further comprise a plug device 140 disposed at least partially adjacent to the sleeve 110 and the first side 220 (see FIG. 2A) and the slug 120. The plug device 140 is configured to be capable of being tightened with respect to the sleeve 110 so as to selectively prevent the slug 120 from being removed from the sleeve 110 through the first side 220. According to some embodiments, such as those shown in FIG. 1B–1C, the plug device 140 may be further configured to be capable of rotating with respect to an inner surface of the sleeve 110. The plug device 140 may further comprise an outer threaded surface 142, and the inner surface of the sleeve 110 may further comprise an inner threaded portion 115 configured to cooperate with the outer threaded surface 142. Thus, the plug device 140 may be configured to be capable of being tightened with respect to the sleeve 110 so as to selectively prevent the slug 120 from being removed from the sleeve 110 through the first side 220 while permitting the slug 120 to be adjusted.

As shown in FIG. 1B, the plug device 140 may further comprise a second tool interface 144 configured to be capable of being engaged and selectively rotated by a tool, such as, for instance, a hex-head screwdriver. In other embodiments, the second tool interface 144 may be configured to be capable of being engaged by and selectively rotated by: flat head screwdrivers, Philips head screwdrivers, "star" cross section screwdrivers, and/or other tools suitable for selectively rotating and/or tightening the plug device 140 with respect to the inner threaded portion 115 of the sleeve 110. In some advantageous embodiments, the second tool interface 144 may be configured to be capable of being engaged by a tool that is substantially different in cross section from the tool that may be capable of engaging the first tool interface 124 and selectively rotating the slug 120 such that the slug 120 may not be inadvertently rotated with respect to the sleeve 110 when the plug device 140 is being rotated with respect to the sleeve 110 so as to retain the slug 120 within the sleeve 110.

Alternatively, the plug device 140 may further comprise one or more resilient rings disposed on an outer surface of the plug device 140 (the resilient rings comprising, for instance, an elastomeric material) such that the plug device 140 may be press-fit into the sleeve 110 adjacent to the first side 220 and the slug 120 so as to selectively prevent the slug 120 from being removed from the sleeve 110 through the first side 220. In addition, the plug device 140 may comprise a variety of materials and/or exterior textures so as to allow the plug device 140 to be retained adjacent to the sleeve 110 and the first side 220 and the slug 120 so as to selectively prevent the slug 120 from being removed from the sleeve 110 through the first side 220.

According to other embodiments as shown, for example, in FIG. 5, a washer 160b, including, for example, a spring or lock washer, may be disposed between the slug 120 and the plug device 140 such that the washer 160b may be configured to exert a frictional retaining force on the slug 120 and the plug device 140 so as to limit the slug 120 (and the tab device 130 operably engaged therewith) from rotating freely with respect to the sleeve 110. In other embodiments, the plug device 140 may be integrated within the first portion 112 of the sleeve 110. For instance, the plug device 140 may comprise a flange integrated with an inner surface of the first portion 112 of the sleeve 110 wherein the flange extends radially inward from the inner surface of the first portion 112 of the sleeve 110 so as to selectively prevent the slug 120 from being removed from the sleeve 110 through the first side 220. In such embodiments, the flange of the plug device 140 may define a tool aperture such that the first tool interface 124 defined in the slug 120 may be accessible via the tool aperture and thereby be capable of being engaged by and selectively rotated by, a tool, such as, for instance a Philips head screwdriver or other tools as described more fully above.

According to some embodiments, such as those shown in FIGS. 1B–1C, the fastener device 100 of the present invention may further comprise a nut 150 disposed at least partially around an outer surface of the first portion 112 of the sleeve 110. Furthermore, the nut 150 may be further configured to be capable of being tightened with respect to the first side 220 (see generally FIG. 2C) so as to selectively prevent the sleeve 110 from being removed from the aperture 240 through the second side 230.

According to some embodiments, the nut 150 may further comprise one or more resilient rings disposed on an inner surface of the nut 150 (the resilient rings comprising, for instance, an elastomeric material) such that the nut 150 may be press-fit around the first portion 112 of the sleeve 110 to engage the first side 220 so as to selectively prevent the fastener device 100 from being removed from the aperture 240 through the second side 230 (see FIGS. 2A and 2C). In addition, the nut 150 may comprise a variety of materials and/or interior textures so as to allow the nut 150 to be retained about the first portion 112 of the sleeve 110 so as to selectively prevent the sleeve 110 (and therefore the fastener device 100) from being removed from the aperture 240 through the second side 230.

According to some embodiments, the nut 150 may be further configured to be capable of rotating with respect to the outer surface of the first portion 112 of the sleeve 110. The nut 150 may further comprise an inner threaded surface 152, and the outer surface of the sleeve 110 may further comprise an outer threaded portion 117 configured to be capable of cooperating with the inner threaded surface 152 of the nut 150 such that the nut 150 may be tightened with respect to the first side 220 (see FIG. 2C) so as to selectively prevent the sleeve 110 from being removed from the aperture 240 through the second side 230.

According to other embodiments as shown, for example, in FIG. 5, a locking washer 160a may be disposed about the first portion 112 of the sleeve 110 between the nut 150 and the first side 220 of the at least one component 210 such that the locking washer 160a maybe configured to exert a frictional retaining force on the nut 150 and the first side 220 of the at least one component 210 so as to prevent the nut 150 from rotating with respect to the sleeve 110 (and thereby loosening the retaining force exerted on the at least one component 210 via the cooperation of the nut 150 and the tab device 130 (see FIG. 2C)). The locking washer 160a may also be contoured or configured to cooperatively fit with nut 150 and at least one component 210a, 210b. One skilled in the art will appreciate that the locking washer 160a may comprise, for instance, a star-shaped locking washer, a split-ring spring washer, or another washer type configured to exert a frictional retaining force on the nut 150 and the first side 220 of the at least one component 210 so as to prevent the nut 150 from rotating with respect to the sleeve 110 (and thereby loosening the retaining force exerted on the at least one component 210.

As shown in FIGS. (2A–2C), the nut 150 may be configured to be tightened by a wrench or other tool suitable for rotating the nut 150 with respect to the first portion 112 of the sleeve 110 so as to bring the nut 150 into contact with the first side 220 of the at least one component 210a, 210b. As such the nut 150 may cooperate with the tab device 130 (in the extended position, as shown in FIG. 2C) so as to retain the fastener device 100 within the aperture 240 defined in the at least one component 210 (depicted in FIG. 2C as a first sheet material 210a and a second sheet material 210b). Also, the outer threaded portion 117 of the sleeve 110 may extend for the full length of the first portion 112 of the sleeve 110 such that the nut 150 may be fully adjustable with respect to the first portion 112 of the sleeve 110. Thus, the nut 150 may be tightened and/or loosened with respect to the first side 220 of the at least one component 210 such that the fastener device 100 may be suitable for extending through and being retained in an aperture 240 defined in at least one component 210 having a variety of different thicknesses. In an alternative embodiment, such as that shown in FIG. 9 a flange 155 may substantially surround the first portion 112 of the sleeve 110 (thereby replacing and eliminating the need for a separate nut 150) so as to prevent the sleeve 110 from being removed from the aperture 240 through the second side 230 of the at least one component 210. The flange 155 may have a circular shape as seen from a top view of the sleeve 110 or in other embodiments may be hexagonally-shaped on its outer surface such as, for instance, a nut 150. According to this embodiment, the sleeve 110 may be inserted into the aperture 240 defined in the at least one component 210 up to the point where the flange 155 extends radially outward from the sleeve 110 such that the sleeve may be prevented from being removed from the aperture 240 through the second side 230 of the at least one component 210.

According to other embodiments as shown, for example, in FIG. 5, a locking washer 160a may be disposed about the first portion 112 of the sleeve 110 between the flange 155 and the first side 220 of the at least one component 210 such that the locking washer 160a may be configured to exert a frictional retaining force on the flange 155 and the first side 220 of the at least one component 210 so as to prevent the flange 155 (and the sleeve 110 from which it radially extends) from rotating with respect to the at least out component 210 (sec FIG. 9)). One skilled in the art will appreciate that the locking washer 160a may comprise, for instance, a star-shaped locking washer, a split-ring spring washer, or another washer type configured to exert a frictional retaining force on the flange 155 and the first side 220 of the at least one component 210 so as to prevent the flange 155 (and the sleeve 110 from which it radially extends) from rotating with respect to the at least one component 210.

FIGS. 2A, 2B, and 2C show a side view cross section of the fastener device 100 according to one embodiment of the present invention wherein the fastener device 100 may extend through an aperture 240 defined in the at least one component 210. In the depicted embodiment, the at least one component 210 comprises two stacked sheet materials comprising a first sheet material 210a (defining a first side 220) and a second sheet material 210b (defining a second side 230). Thus, the first portion 112 of the sleeve 110 is configured to extend from the aperture 240 to the first side 220 and the second portion 114 (defining the aperture 116) is configured to extend from the aperture 240 to the second side 230.

As shown in FIG. 2A the fastener device 100 may be placed into the aperture 240 from the first side 220. For initial insertion into the aperture 240, the slug 120 and the at least one pin 122 extending therefrom may be rotated with respect to the sleeve 110 so as to return the tab device 130 to the retracted position (see FIGS. 3A and 4A) relative to the sleeve 110. In the retracted position, the tab device 130 does not extend laterally outward from the aperture 116 defined in the second portion of the sleeve 110 such that the sleeve 110 (and the fastener device 100) may be inserted into the aperture 240 from the first side 220. According to some embodiments of the fastener device 100, the nut 150 may be placed about the first portion 112 of the sleeve 110 prior to the insertion of the fastener device 100 into the aperture 240 so as to prevent the fastener device 100 from passing completely through the aperture 240 from the first side 220 to the second side 230.

As shown in FIG. 2B, once inserted into the aperture 240, the slug 120 (and the at least one pin 122 extending therefrom) may be rotated with respect to the sleeve 110 so as to rotate the tab device 130 relative to, for instance, the at least one spring pin 111 (as described more fully above). The rotation of the slug 120 (by for instance, a tool suitable for rotating the slug through about one-quarter turn) may, in turn, extend the tab device 130 from the retracted position (see FIGS. 3A and 4A) to the extended position (see FIGS. 3B and 4B) relative to the sleeve. Thus, the tab device 130 may extend laterally from the aperture 116 defined in the second portion 114 of the sleeve 110 so as to prevent the sleeve 110 from being removed from the aperture 240 through the first side 220.

FIG. 2C shows the fastener device 100 retained in the aperture 240 defined by the first and second sheet materials 210a, 210b, respectively. As shown, the nut 150 may be tightened with respect to the first side 220 so as to prevent the sleeve 110 from being removed from the aperture through the second side 230. In addition, the compressive force exerted on the first and second sheet materials 210a, 210b may also act to stabilize the fastener device 100 within the aperture 240 so as to effectively retain the fastener device 100 in the aperture.

According to other embodiments of the fastener device 100 of the present invention, the fastener device 100 may be further configured to provide a conduit through the at least one component 210 between the first side 220 and the second side 230. For instance, as shown in FIG. 5 the fastener device 100 of the present invention, may in some embodiments, comprise a slug 120 wherein the slug 120 defines a conduit 126 extending therethrough so as to allow for materials to pass through the sleeve 110 between the first side 220 and the second side 230 when the tab device 130 is extended laterally outward through the aperture 116 (as shown, for instance, in FIG. 4B). According to some embodiments, wherein the sleeve 110 further comprises a floor 118, the floor may also be provided with an aperture 119 such that floor does not prevent the passage of material through the sleeve 110 between the first side 220 and the second side 230. The conduit 126 defined in the slug 120 according to this embodiment may have, for instance, a hexagonal shaped cross-section such that the conduit may receive a hex key suitable for rotating the slug 120 and thereby actuating the tab device 130 (as more fully described above). As such, this embodiment of the fastener device of the present invention may provide, for example, a conduit for materials to pass between the first side 220 and the second side 230 of the at least one component 210. In addition, this embodiment may further allow wiring, cord, rope, fluids (including air and/or various types of liquids) to pass through the fastener device 100 to the second side 230 of the at least one component 210.

As shown in FIGS. 6 and 7, the fastener device 100 according to some embodiments of the present invention may further comprise an extension device 610 operably engaged with the first portion 112 of the sleeve 110 configured to extend therefrom so as to be capable of operably engaging a second extension device 610a extending from a second fastener device 100a such that the at least one component 210 may be attached to at least one second component 210c defining a second aperture 240a having the second fastener device 100a extending therethrough. As shown in FIG. 6, the extension device 610 may further comprise a connecting aperture 620 configured to receive, for instance a flanged bolt with butterfly nut 630 (see FIG. 7) suitable for connecting two extension devices 610, 610a as shown in FIG. 7. The connecting aperture 620 may further comprise (as shown generally in FIG. 6) a slot, configured to receive, for instance, a flanged bolt with a butterfly nut 630 operably engaged therewith. As such, this embodiment may allow for the fastening of two separate components (such as two separate sheets 210, 210c) while allowing for a desired adjustable spacing between the separate sheets 210, 210c. In addition, the connecting aperture 620 defined in the extension device 610 may allow the two separate sheets 210, 210c to be mounted in a non-parallel arrangement with respect to each other, at for instance, an oblique angle relative to one another.

As shown in FIG. 8, and according to another advantageous embodiment of the present invention, the fastener device 100 may further comprise a cord receiver device 710 operably engaged with the first portion 112 of the sleeve 110 and configured to extend from the first portion 112 of the sleeve 110 so as to be further configured to be capable of operably engaging a cord 720 such that the cord 720 may be attached to the at least one component 210. The cord 720 may comprise, for instance, polymeric resilient "bungee" cord, twine, string, or other types of cord material suited for threading through the cord receiver 710. The cord receiver 710 may further comprise a ring 715 through which the cord 720 may be passed and subsequently knotted so as to enlarge a portion of the cord 720 and thereby retain the cord 720 in the ring 715. In other embodiments, the cord 720 may be passed through the ring 715 and subsequently tied to an object (such as, for instance, a washer) that is suitably large for retaining the cord 720 in the ring 715 such that the cord 720 may be attached to the cord receiver device 710 and thereby be attached to the at least one component 210 with which the fastener device 100 may be engaged.

The fastener device 100 of the present invention, and the components thereof, may comprise a variety of different materials that may be suitable for tailoring the fastener device 100 for use in a variety of environments, for a number of different uses, and for attachment to a variety of different materials. For instance, the sleeve 110, tab device 130 and nut 150 may be composed of a hard metallic material, such as, for instance stainless steel so as to provide a durable bearing surface for retaining the fastener device 100 within the aperture 240 defined in the at least one component 210. For some applications, however, it may be advantageous if the bearing surfaces of the fastener device 100 comprise, for instance, aluminum or carbon fiber composite materials such as in aviation applications wherein the weight of multiple fastener devices may be a consideration in the design of the at least one component 210. In addition, in embodiments of the present invention wherein the fastener device 100 further comprises a conduit 126 (defined, for instance, in the slug 120) it may be advantageous to provide a liner material such as PTFE or another polymeric material in the walls of the conduit 126 so as to ease the passage of material therethrough and/or provide protection to the sleeve 110 and other components of the fastener device 100 from potentially corrosive material that may pass through the conduit between the first side 220 and the second side 230 of the at least one component 210. One skilled in the art will appreciate that the various components of the fastener device 100 of the present invention may be composed of a variety of specialty materials suitable for the application chosen for the fastener device 100.

Referring again to FIGS. 2A–2C a method for facilitating the attachment of a fastener device 100 comprising a sleeve 110 to at least one component 210 having a first side 220 and a second side 230 is described. According to one embodiment, the method of the present invention may first comprise the step of inserting the fastener device 100 through an aperture 240 defined by the at least one component 210 (210a, 210b) such that an first portion 112 of the sleeve 110 extends from the aperture 240 on the first side 220, and such that an second portion 114 of the sleeve 110 extends from the aperture 240 on the second side 230. The method further comprises the step of expanding a tab device 130 from a aperture 116 defined by the second portion 114 of the sleeve 110 so as to selectively prevent the sleeve 110 from being removed from the aperture 240 through the first side 220.

According to other embodiments, the method of the present invention may further comprise the steps of: tightening a nut 150 disposed at least partially around an outer surface of the first portion 112 of the sleeve 110 such that the nut 150 is secured with respect to the first side 220 so as to selectively prevent the sleeve 110 from being removed from the aperture 240 through the second side 230; locking the nut 150 in a tightened position with respect to the first side 220; applying a plug device 140 adjoining the sleeve 110, the first side 220 and the slug 120 so as to prevent the slug 120 from being removed from the sleeve 110 through the first side 220; and locking the plug device 140 in a tightened position with respect to the slug 120.

According to other embodiments of the method of the present invention, the expanding step described above may further comprise rotating a slug 120 disposed at least partially within the sleeve 110, wherein the slug 120 is operably engaged with the tab device 130 so as to be further configured to be capable of expanding the tab device 130 from the aperture 116 so as to selectively prevent the sleeve 110 from being removed from the aperture 240 through the first side 220.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A fastener device comprising:
   a sleeve adapted to extend through an aperture defined by at least one component having a first side and a second side, a first portion of the sleeve being configured to extend from the aperture on the first side, a second portion of the sleeve being configured to extend from the aperture on the second side, the second portion defining a slit;
   a slug disposed at least partially adjacent to the sleeve and configured to be capable of rotating with respect to an inner surface thereof, the slug having at least one pin extending therefrom toward the second portion of the sleeve defining the slit; and
   a tab device disposed at least partially within the sleeve and capable of operably engaging the at least one pin, the tab device defining a guide slot configured to be capable of receiving the at least one pin, the tab device being responsive to the at least one pin as the slug is rotated so as to extend laterally outward through the slit to an extended position as the slug is rotated in a first direction, and to retract laterally inward through the slit to a retracted position as the slug is rotated in a second direction, the tab device thereby cooperating with the slug so as to selectively prevent the sleeve from being removed from the aperture through the first side.

2. The fastener device according to claim 1, wherein the slug is configured to be capable of rotating less than about one half turn with respect to the inner surface of the sleeve in order to extend the tab device from the retracted position to the extended position.

3. The fastener device according to claim 1, wherein the slug is configured to be capable of rotating about one quarter turn with respect to the inner surface of the sleeve in order to extend the tab device from the retracted position to the extended position.

4. The fastener device according to claim 1, wherein the guide slot defines a first catch stop configured to retain the tab device in the retracted position and a second catch stop configured to retain the tab device in the extended position.

5. The fastener device according to claim 1, wherein the second portion of the sleeve further comprises a floor and at least one pin extending from the floor toward the first portion of the sleeve, the at least one pin being operably engaged with the tab device so that the tab device may rotate about the at least one pin so as to extend laterally outward through the slit to the extended position as the slug is rotated in the first direction, and to retract laterally inward through the slit to the retracted position as the slug is rotated in the second direction.

6. The fastener device according to claim 1, further comprising a plug device disposed at least partially adjacent to the sleeve, the first side, and the slug such that the plug device is configured to be capable of being tightened with respect to the sleeve so as selectively prevent the slug from being removed from the sleeve through the first side.

7. The fastener device according to claim 6, wherein the plug device is further configured to be capable of rotating with respect to the inner surface of the sleeve, and wherein the plug device further comprises an outer threaded surface, and the inner surface of the sleeve further comprises an inner threaded portion thereby cooperating with the outer threaded surface of the plug device such that the plug device is configured to be capable of being tightened with respect to the sleeve so as to selectively prevent the slug from being removed from the sleeve through the first side.

8. The fastener device according to claim 7, further comprising a locking washer disposed between the slug and the plug device configured to exert a frictional retaining force on the slug and the plug device so as to limit the slug from rotating with respect to the inner surface of the sleeve.

9. The fastener device according to claim 1 further comprising a nut disposed at least partially around an outer surface of the first portion of the sleeve configured to be capable of being tightened with respect to the first side so as to selectively prevent the sleeve from being removed from the aperture through the second side.

10. The fastener device according to claim 9, wherein the nut is further configured to be capable of rotating with respect to a receiving surface of the sleeve, and wherein the nut further comprises a substantially threaded surface, and the receiving surface of the sleeve further comprises a complementary threaded portion thereby cooperating with the threaded surface of the nut such that the nut is configured to be capable of being tightened with respect to the first side so as to selectively limit the sleeve from being removed from the aperture through the second side.

11. The fastener device according to claim 10, further comprising a locking washer disposed between the nut and the first side of the at least one component, the locking washer designed to exert a frictional retaining force on the nut and the first side so as to limit the nut from rotating with respect to the first side.

12. The fastener device according to claim 1, wherein the slug defines a conduit extending therethrough so as to allow communication through the sleeve between the first side and the second side when the tab device is extended substantially laterally outward through the slit.

13. The fastener device according to claim 1, further comprising an extension device operably engaged with the first portion of the sleeve configured to extend therefrom so as to be capable of operably engaging at least a second extension device extending from a second fastener device such that the at least one component may be attached to at least one second component defining a second aperture having the second fastener device extending therethrough.

14. The fastener device according to claim 1, further comprising a cord receiver device operably engaged with the first portion of the sleeve and being configured to extend therefrom so as to be further configured to be capable of operably engaging a cord such that the cord may be attached to the at least one component.

* * * * *

UNITED STATES PATENT AND TRADEMARK OFFICE
CERTIFICATE OF CORRECTION

| | | |
|---|---|---|
| PATENT NO. | : 7,153,074 B2 | Page 1 of 1 |
| APPLICATION NO. | : 10/903776 | |
| DATED | : December 26, 2006 | |
| INVENTOR(S) | : Wei | |

It is certified that error appears in the above-identified patent and that said Letters Patent is hereby corrected as shown below:

Column 10,

Line 37, "maybe" should read --may be--.

Column 11,

Line 29, "out" should read --one--.

Signed and Sealed this

First Day of May, 2007

JON W. DUDAS
*Director of the United States Patent and Trademark Office*